US012729714B2

(12) United States Patent
Hu et al.

(10) Patent No.: US 12,729,714 B2
(45) Date of Patent: Sep. 8, 2026

(54) FORM CONVERTING MECHANISM AND DISPLAY APPARATUS

(71) Applicant: SHENZHEN SKYWORTH-RGB ELECTRONIC CO., LTD., Shenzhen (CN)

(72) Inventors: Lingchao Hu, Shenzhen (CN); Weixiong Chen, Shenzhen (CN); Yubao Guo, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 310 days.

(21) Appl. No.: 18/641,909

(22) Filed: Apr. 22, 2024

(65) Prior Publication Data

US 2024/0271657 A1 Aug. 15, 2024

Related U.S. Application Data

(63) Continuation of application No. PCT/CN2021/143230, filed on Dec. 30, 2021.

(30) Foreign Application Priority Data

Nov. 10, 2021 (CN) ......................... 202111330446.7

(51) Int. Cl.
*F16C 11/12* (2006.01)
*G09F 9/30* (2006.01)

(52) U.S. Cl.
CPC .............. *F16C 11/12* (2013.01); *G09F 9/301* (2013.01)

(58) Field of Classification Search
CPC .. F16C 11/04; F16C 11/12; G06F 1/16; G06F 1/1652; G06F 1/1681; G09F 9/301; G02F 1/133308; G02F 1/133314; G09G 2380/02
See application file for complete search history.

(56) References Cited

U.S. PATENT DOCUMENTS 11,749,138 B2 * 9/2023 Park ........................ G09F 9/301 361/679.01
2014/0198465 A1 7/2014 Park
(Continued)

FOREIGN PATENT DOCUMENTS

CN 103814403 A 5/2014
CN 103985322 A 8/2014
(Continued)

OTHER PUBLICATIONS

First Office Action issued in counterpart Chinese Patent Application No. 202111330446.7, dated Jun. 21, 2022.
(Continued)

*Primary Examiner* — Robin J Mishler
(74) *Attorney, Agent, or Firm* — Westbridge IP LLC

(57) ABSTRACT

Disclosed are a form converting mechanism and a display apparatus. A first connecting member in the form converting mechanism includes a first outer end, a first pivotal portion and a first inner end. A second connecting member includes a second outer end, a second pivotal portion and a second inner end. Two ends of the third connecting member are respectively pivoted with the first pivotal portion and the second pivotal portion, and two ends of the fourth connecting member are respectively connected to the first inner end and the second inner end. At least one of the first connecting member, the second connecting member, the third connecting member and the fourth connecting member can withstand an external force to change a distance from the first outer end to the second outer end.

20 Claims, 12 Drawing Sheets

(56) References Cited

U.S. PATENT DOCUMENTS

| | | | | |
|---|---|---|---|---|
| 2015/0296641 | A1 | 10/2015 | Song et al. | |
| 2016/0040764 | A1* | 2/2016 | Park | G09F 9/301 361/679.01 |

FOREIGN PATENT DOCUMENTS

| | | | |
|---|---|---|---|
| CN | 104517557 | A | 4/2015 |
| CN | 104766539 | A | 7/2015 |
| CN | 105190732 | A | 12/2015 |
| CN | 105259607 | A | 1/2016 |
| CN | 106847096 | A | 6/2017 |
| CN | 106991920 | A | 7/2017 |
| CN | 110005695 | A | 7/2019 |
| CN | 110136591 | A | 8/2019 |
| CN | 110442196 | A | 11/2019 |
| CN | 112150919 | A | 12/2020 |
| JP | H1026754 | A | 1/1998 |
| JP | 2006023676 | A | 1/2006 |

OTHER PUBLICATIONS

International Search Report and Written Opinion issued in corresponding PCT Application No. PCT/CN2021/143230, dated Jun. 29, 2022.

Notification to Grant Patent Right for Invention issued in counterpart Chinese Patent Application No. 202111330446.7, dated Jul. 14, 2022.

* cited by examiner

FORM CONVERTING MECHANISM AND DISPLAY APPARATUS

CROSS-REFERENCE TO RELATED APPLICATIONS

The present application is a continuation application of International Application No. PCT/CN2021/143230, filed on Dec. 30, 2021, which claims priority to Chinese Patent Application No. 202111330446.7, filed on Nov. 10, 2021. The disclosures of the above-mentioned applications are incorporated herein by reference in their entireties.

TECHNICAL FIELD

The present application relates to the technical field of image display, and in particular to a form converting mechanism and a display apparatus.

BACKGROUND

The size of display products is getting larger and larger. Nowadays, the side of the displays of the computers is comparable to the size of the televisions in the past time, and the display of the present televisions also pursues larger display screens. However, the user's usage distance is often limited, which is usually less than one meter, and the viewing experience of large-screen displays at close range is poor. Thus, the curved displays emerged, which allows the user's eyes to be positioned near the curvature center of the display, and improves the viewing experience. The user's viewing angle is more comprehensive, but the eye fatigue is more likely to occur. In addition, users do not always need the curved surface, and users have an increasing demand for changes between the curved surface and the flat surface of the display.

The flexible screen body can meet the form changes between the curved surface and the flat surface, but the shape of the flexible screen body is different after each form change, and the quality of the form converting is poor.

SUMMARY

Embodiments of the present disclosure provide a form converting mechanism to improve the quality of the form converting of the flexible screens.

In order to achieve the above purpose, the form converting mechanism provided in the present application is configured to be connected with the back side of the flexible screen body, including: a first connecting member; a second connecting member; a third connecting member; and a fourth connecting member.

The first connecting member, the second connecting member, the third connecting member and the fourth connecting member are connected in sequence.

The first connecting member includes a first outer end configured to be connected to one side end of the flexible screen body, a first pivotal portion and a first inner end; the second connecting member includes a second outer end configured to be connected to the other side end of the flexible screen body, a second pivotal portion and a second inner end.

Two ends of the third connecting member are respectively pivoted with the first pivotal portion and the second pivotal portion, and two ends of the fourth connecting member are respectively connected to the first inner end and the second inner end; at least one of the first connecting member, the second connecting member, the third connecting member and the fourth connecting member is configured to withstand an external force to change a distance from the first outer end to the second outer end.

The present application also provides a display apparatus, including a flexible screen body and the form converting mechanism.

In the technical solution of the present application, after at least one of the first connecting member, the second connecting member, the third connecting member, and the fourth connecting member that has constituted the linkage mechanism bears an external force, the third connecting member is cooperated with the fourth connecting member, so that the distance between the first outer end and the second outer end changes steadily, and the form of the flexible screen body connected to the first outer end and the second outer end changes stably under the action of the first outer end and the second outer end, which improves the form stability of the flexible screen body after the form converting, and improves the quality of the form converting of the flexible screen body.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
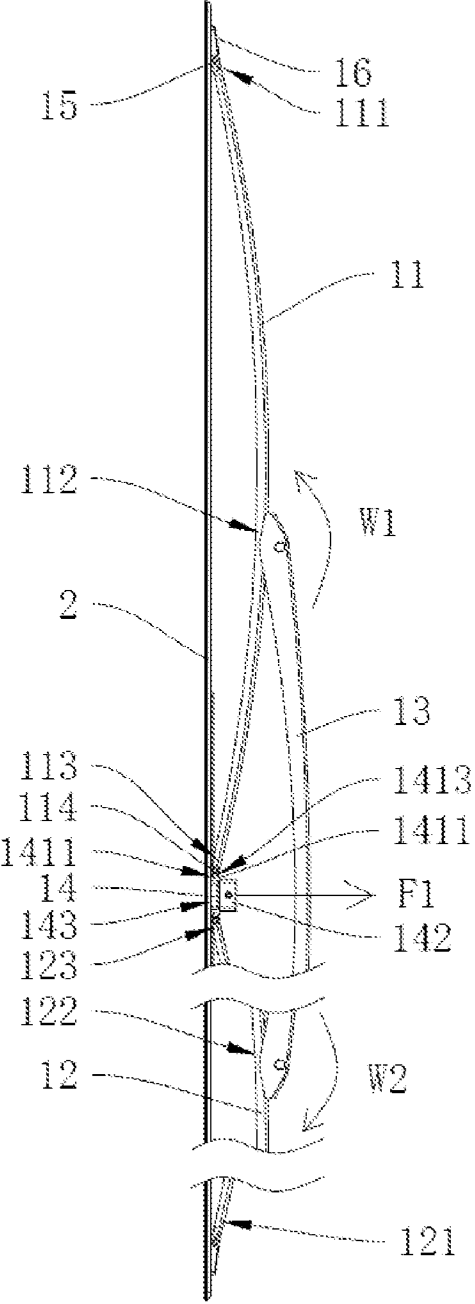
FIG. 1 is a front view of a flexible platform in a flat state of a display apparatus according to an embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In addition, the descriptions of "first", "second", etc. are only for the purpose of description, and should not be construed as indicating or implying relative importance or implicitly indicating the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The present application provides a display apparatus, including a flexible screen body 2 and a form converting mechanism.

Referring to FIG. 1 to FIG. 11, in an embodiment of the present application, the form converting mechanism is configured to be connected with a back side (i.e, the right side in FIG. 1) of the flexible screen body 2. The form converting mechanism includes a first connecting member 11, a second connecting member 12, a third connecting member 13 and a fourth connecting member 14. The first connecting member 11, the second connecting member 12, the third connecting member 13 and the fourth connecting member 14 are all configured as plate structures, and the whole of which is parallel to the backside plane of the flexible screen body 2. The first connecting member 11, the fourth connecting member 14 and the second connecting member 12 are connected in sequence along an up-to-down direction in FIG. 1. The first connecting member 11 includes a first outer end 111, a first pivotal portion 112 and a first inner end 113, and the first pivotal portion 112 is configured as a convex rib. The second connecting member 12 includes a second outer end 121, a second pivotal portion 122 and a second inner end 123, and the second pivotal portion 122 is configured as a convex rib. The first outer end 111 is configured to be connected to one side end of the flexible screen body 2 (i.e. the upper end of the back side of the flexible screen body 2 in FIG. 1), and the second outer end 121 is configured to be connected with the other side end of the flexible screen body 2 (i.e. the lower end of the back side of the flexible screen body 2 in FIG. 1). Two ends of the third connecting member 13 are respectively pivoted with the first pivotal portion 112 and the second pivotal portion 122, and two ends of the fourth connecting member 14 are connected with the first inner end 113 and the second inner end 123 respectively. At least one of the first connecting member 11, the second connecting member 12, the third connecting member 13, and the fourth connecting member 14 is configured to withstand the external force to change the distance between the first outer end 111 and the second outer end 121.

Figure 3:
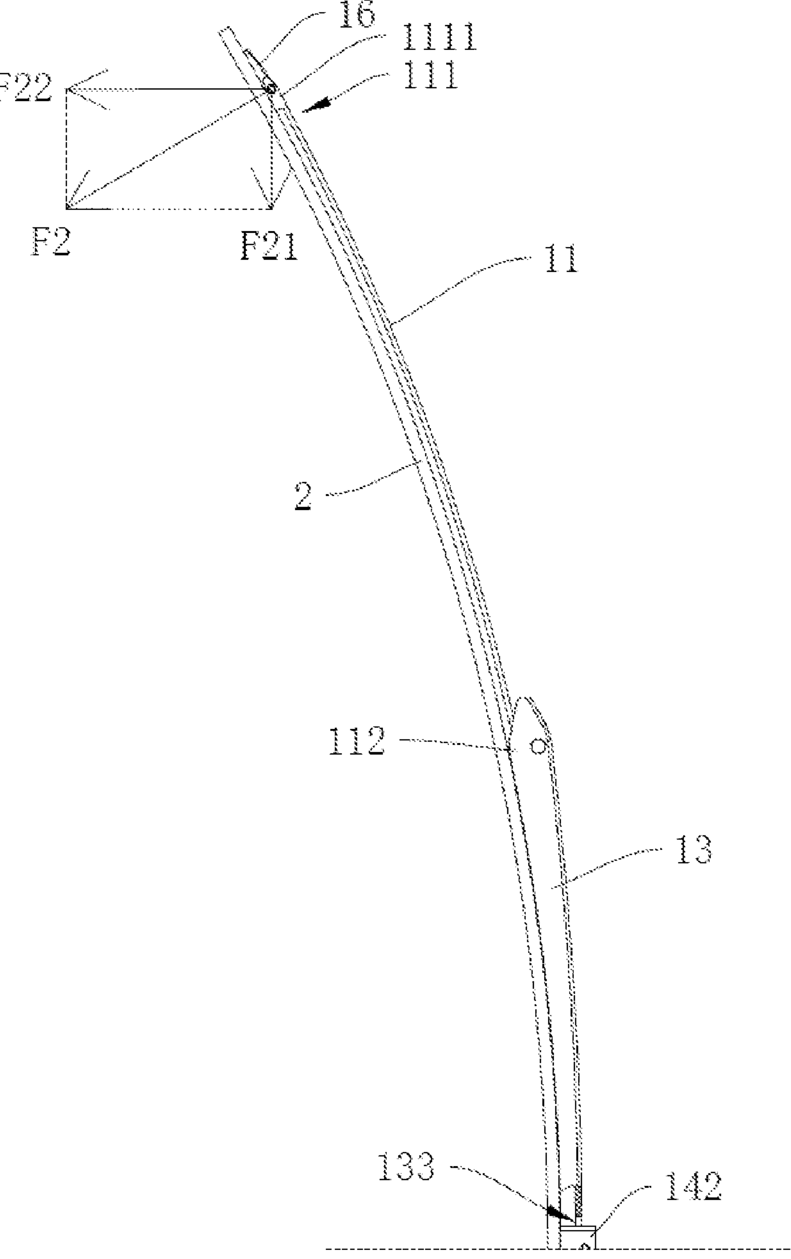
FIG. 3 is a front view of the flexible screen body in a curved state of the display apparatus according to an embodiment of the present application.
Figure 4:
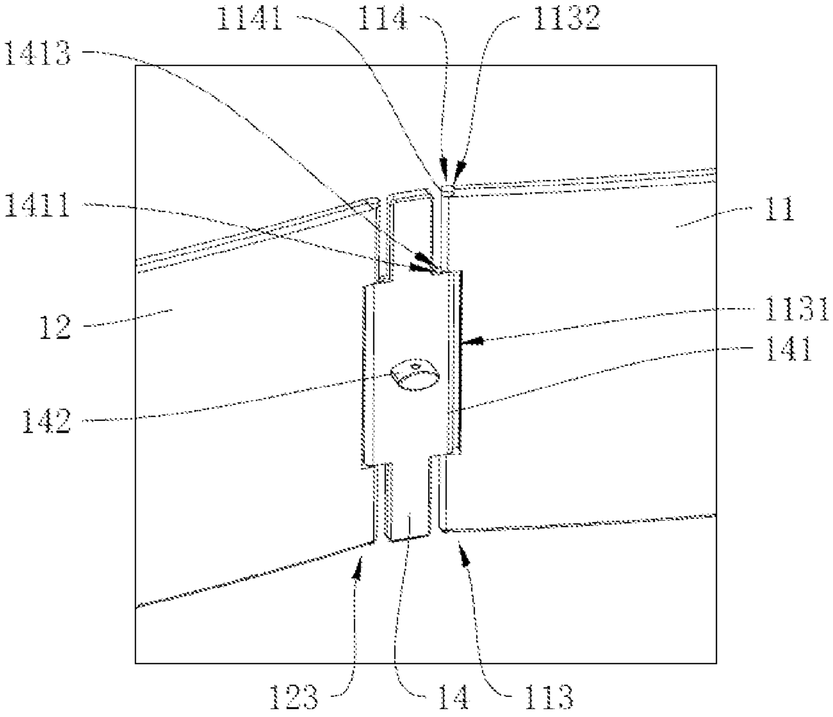
FIG. 4 is a schematic structural view of a connection of a first connecting member, a fourth connecting member, and a second connecting member of the display apparatus according to an embodiment of the present application.
Figure 5:
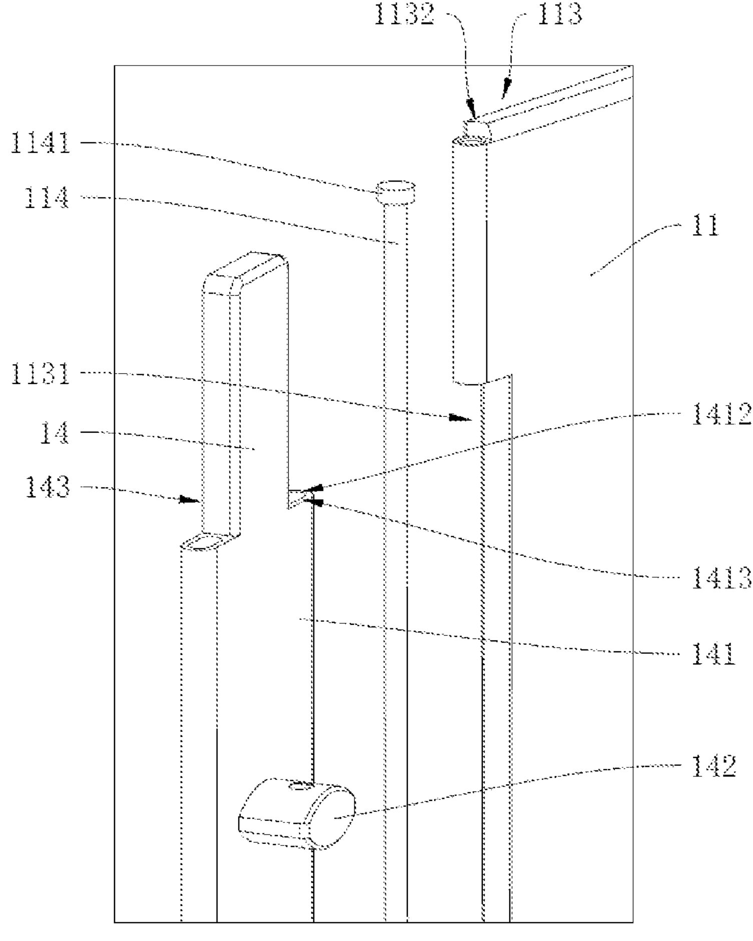
FIG. 5 is an exploded view of the first connecting member and the fourth connecting member of the display apparatus according to an embodiment of the present application.

In this embodiment, the fourth connecting member 14 is provided with a screen body connecting end 143 configured to be connected to the flexible screen body 2. Specifically, the screen body connecting end 143 can be connected to the flexible screen body 2 through fasteners such as screws and bolts. The fourth connecting member 14 is provided with a traction member 142 extending toward the third connecting member 13. When the flexible screen body 2 is converted from the flat state in FIG. 1 to the curved state, the traction member 142 is configured to withstand the external force (such as the traction force F1 in FIG. 1), thereby driving the first connecting member 11 and the second connecting member 12 to rotate around the directions of W1 and W2 respectively relative to two ends of the third connecting member 13. At this time, the distance between the first outer end 111 and the second outer end 121 decreases, so that the flexible screen body 2 is curved under the action of the component force F21 as shown in FIG. 3. It should be noted that in the initial state, the component force F21 may be parallel to the flat surface of the flexible screen body 2. At this time, an auxiliary external force can be added to push the flexible screen body 2 to the right side. When the flexible screen body 2 is in the curved state, the component force F21 can make the flexible screen body 2 stably maintain in curving. At this time, the form converting mechanism can be locked through the fixing apparatus.

As shown in FIG. 4 to FIG. 7, a first pivot structure is provided between the fourth connecting member 14 and the first inner end 113. The first pivot structure includes a first connecting hole 1411 and a first shaft body 114. The first connecting hole 1411 is sleeved on the first shaft body 114, and the first shaft body 114 is rotatably connected with the first connecting hole 1411, so that the first connecting member 11 can rotate relative to the fourth connecting member 14.

The first pivot structure also includes a second connecting hole 1412 provided side by side with the first connecting hole 1411. The second connecting hole 1412 is configured to rotatably be connected with the first shaft body 114. A through groove 1413 is provided between the first connecting hole 1411 and the second connecting hole 1412, two ends of the through groove 1413 are communicated with the first connecting hole 1411 and the second connecting hole 1412 respectively, and the first shaft body 114 is provided with a passing path moving along the length direction of the through groove 1413. The first connecting hole 1411 is provided inside the second connecting hole 1412.

Figure 6:
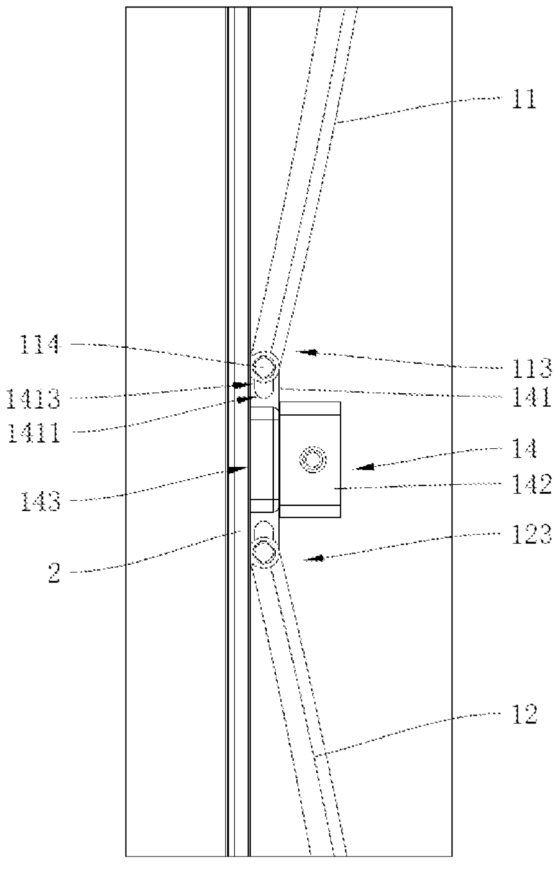
FIG. 6 is a partial enlarged view of the flexible platform in the flat state of the display apparatus according to an embodiment of the present application.
Figure 7:
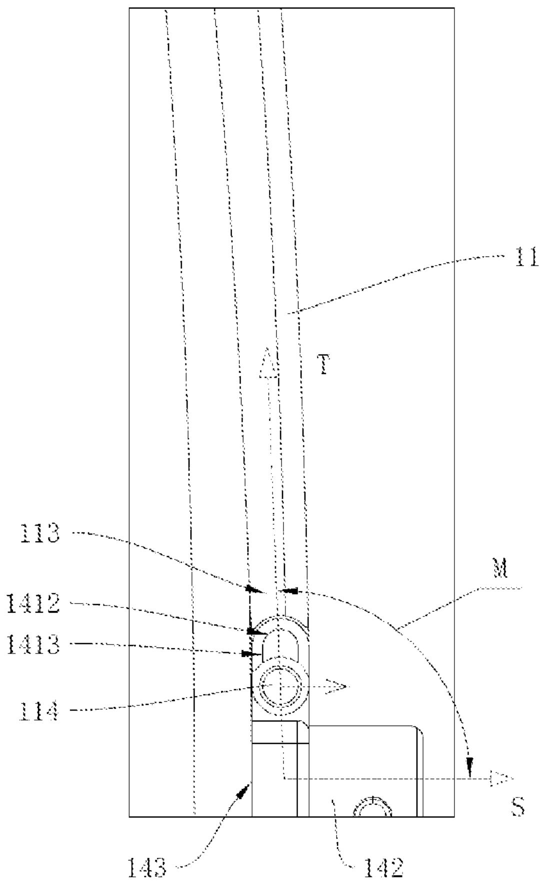
FIG. 7 is a partial enlarged view of the flexible screen body in the curved state of the display apparatus according to an embodiment of the present application.

In this embodiment, when the flexible screen body 2 is converted from the flat state as shown in FIG. 6 to the curved state as shown in FIG. 7, the first shaft body 114 is converted from cooperating with the second connecting hole 1412 to cooperating with the first connecting hole 1411. During this process, the first shaft body 114 moves through the through groove 1413, that is, the passing path moving along the length direction of the through groove 1413. The first connecting hole 1411, the second connecting hole 1412, and the through groove 1413 reduce the possibility of jamming between the fourth connecting member 14, the first connecting member 11 and the second connecting member 12 during the movement of the form converting mechanism, making form conversion process of the flexible screen body 2 smoother.

The fourth connecting member 14 has an away path in a direction away from the flexible screen body 2 (as shown by the S vector in FIG. 7), and the fourth connecting member 14 has an abutting position abutted against the third connecting member 13. At the abutting position, the angle (as shown by vector angle M in FIG. 7) between the tangent direction (as shown by T vector in FIG. 3) of the first connecting member 11 at the first inner end 113 towards the first outer end 111 and the away path is greater than or equal to 90 degrees. At the abutting position, the first shaft body 114 is connected to the first connecting hole 1411. When the fourth connecting member 14 is at a starting point of the away path, the first shaft body 114 is connected to the second connecting hole 1412. The angle between the tangent direction of the first connecting member 11 at the first inner end 113 towards the first outer end 111 and the away path is greater than or equal to 90 degrees, which can prevent the first connecting member 11 from rotating back, that is, prevent the flexible screen body 2 from spontaneously returning to the flat state, so that the flexible screen body 2 can be locked in the curved state. When necessary, the user exerts a certain force to rotate back the first connecting member 11, so that the flexible screen body 2 can return to the flat state.

The first inner end 113 is provided with a first opening 1131, one side of the fourth connecting member 14 towards the first connecting member 11 is provided with a first convex 141, the first convex 141 extends into the first opening 1131, and the first pivot structure is provided between the first convex 141 and the first opening 1131, so that the pivot structure between the fourth connecting member 14 and the first inner end 113 can be easily installed. The first convex 141 is provided on the fourth connecting member 14, which can reduce the rotation of the first convex 141 and prevent the first convex 141 from rotating and squeezing other components.

The first shaft body 114 transversely penetrates the sidewall of the first convex 141 and the first opening 1131, and an end portion of the first shaft body 114 is provided with a flange 1141. A counter recess 1132 is provided outside of the sidewall of the first opening 1131, and the flange 1141 is accommodated in the counter recess 1132. The counter recess 1132 includes a complete hole wall and a partial hole wall. In this embodiment, the counter recess 1132 includes the partial hole wall. The counter recess 1132 can accommodate the flange 1141, reducing the chance of the flange 1141 being exposed and scratching other components.

In this embodiment, the first pivot structure is also provided between the second connecting member 12 and the fourth connecting member 14.

The first connecting member 11 and the second connecting member 12 are both configured as arc-shaped plates, and one side of the third connecting member 13 towards the fourth connecting member 14 is provided with a first arc surface 1311. The inner section of the outer convex surface of the first connecting member 11 and the inner section of the outer convex surface of the second connecting member 12 are both configured to abut against the first arc surface 1311.

The third connecting member 13 also includes a second arc surface 1312. The first arc surface 1311 and the second arc surface 1312 are respectively provided on both sides of the first pivotal portion 112. The distance between the first arc surface 1311 and the second arc surface 1312 gradually increases along the direction away from the fourth connecting member 14, and the first arc surface 1311 is configured to abut against the first connecting member 11.

A first vertical plate 131 is provided on the side of the third connecting member 13 towards the fourth connecting member 14, and both the first arc surface 1311 and the second arc surface 1312 are provided on the side of the first vertical plate 131 towards the fourth connecting member 14.

Figure 9:
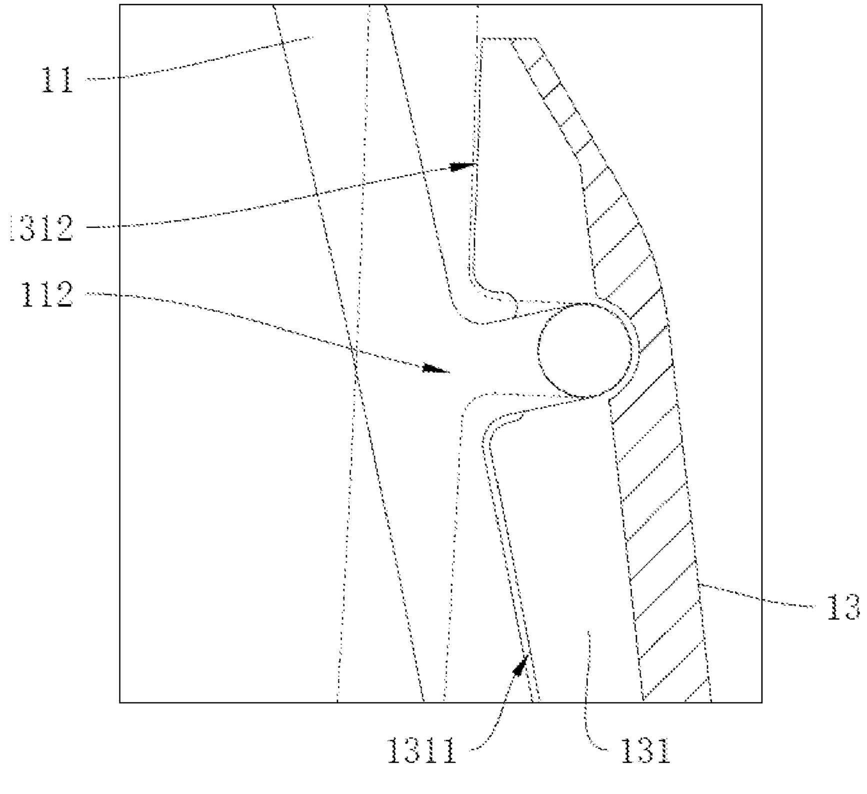
FIG. 9 is a schematic structural view of a connection of the first connecting member and the third connecting member of the display apparatus according to an embodiment of the present application.

The distance between the first arc surface 1311 and the second arc surface 1312 gradually increases in the direction away from the fourth connecting member 14, which can respectively abut against the first connecting member 11 at the corresponding position when the flexible screen body 2 is in different forms, so that the flexible screen body 2 can respectively maintain structural stability in both forms. As shown in FIG. 9, the first arc surface 1311 is configured to abut against the first connecting member 11 at the solid line position when the flexible screen body 2 is in the curved state, and is configured to fit with the surface of the first connecting member 11. The second arc surface 1312 is configured to abut against the first connecting member 11 at the dotted line position when the flexible screen body 2 is in the flat state, and is configured to fit the surface of the first connecting member 11. The first arc surface 1311 is abutted against the first connecting member 11 when the flexible screen body 2 is in the curved state, so that the flexible screen body 2 can more stably maintain in the curved state. The second arc surface 1312 is abutted against the first connecting member 11 when the flexible screen body 2 is in the flat state, so that the flexible screen body 2 can more stably maintain in the flat state.

A second vertical plate 132 is also provided on an outer end of one side of the third connecting member 13 towards the fourth connecting member 14. At least a height of the second vertical plate 132 is partly greater than a height of the first vertical plate 131, so that the second vertical plate 132 at least partially covers the end portion of the first connecting member 11 and the end portion of the second connecting member 12. The second vertical plate can reduce dust and other foreign matters from entering the form converting mechanism, reducing the risk of the form converting mechanism getting stuck and improving the cleanliness of the form converting mechanism. In this embodiment, the third connecting member 13, the first vertical plate 131, and the second vertical plate 132 can be configured to be integrally formed. Both ends of the third connecting member 13 are provided with a first vertical plate 131 and a second vertical plate 132.

Figure 8:
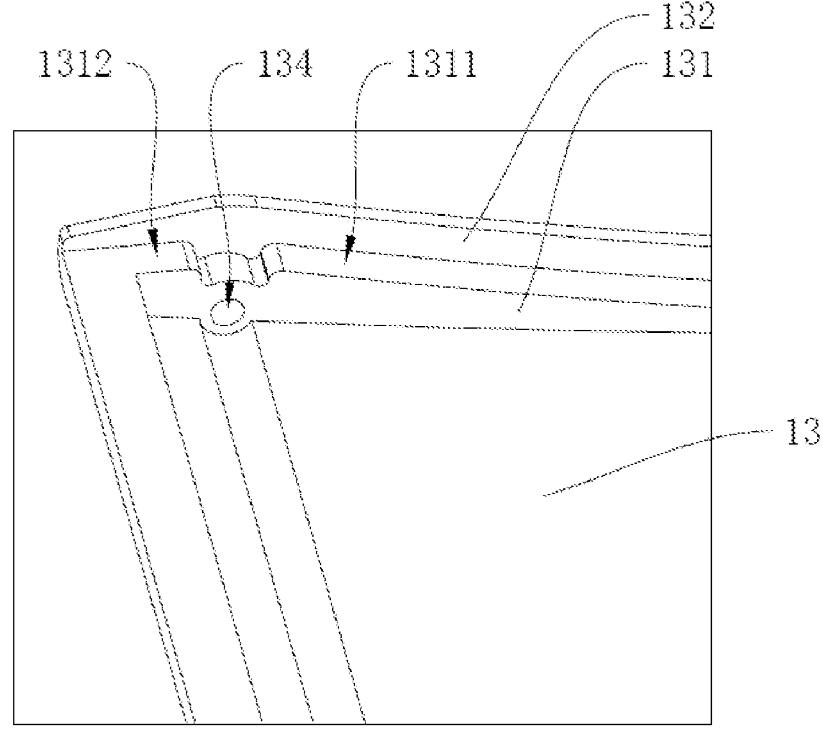
FIG. 8 is a partial enlarged view of the third connecting member of the display apparatus according to an embodiment of the present application.
Figure 10:
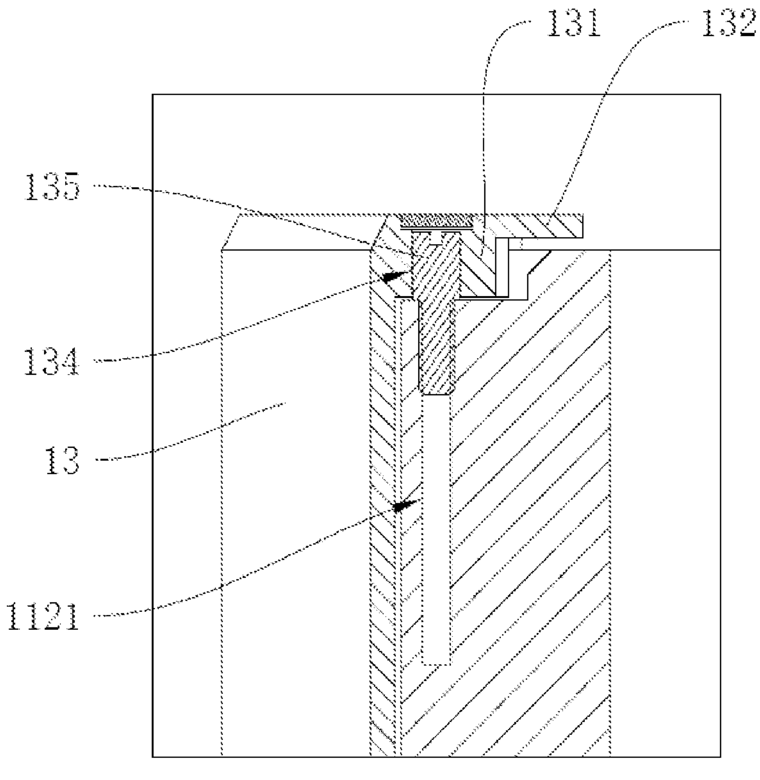
FIG. 10 is a schematic structural view of the first connecting member abutted against the third connecting member of the display apparatus according to an embodiment of the present application.

As shown in FIG. 8 to FIG. 10, a second pivot structure is provided between the third connecting member 13 and the first pivotal portion 112. The second pivot structure includes a third connecting hole 1121, a fourth connecting member 134 and a second shaft body 135. In this embodiment, the third connecting hole 1121 is provided on the first pivotal portion 112, the fourth connecting member 134 is provided on the third connecting member 13, and the fourth connecting member 134 penetrates through the first vertical plate 131. The third connecting hole 1121 and the fourth connecting member 134 are respectively sleeved on two ends of the second shaft body 135, and the fourth connecting member 134 is rotatably connected to the second shaft body 135. The third connecting hole 1121 is threadedly connected to the second shaft body 135.

Figure 11:
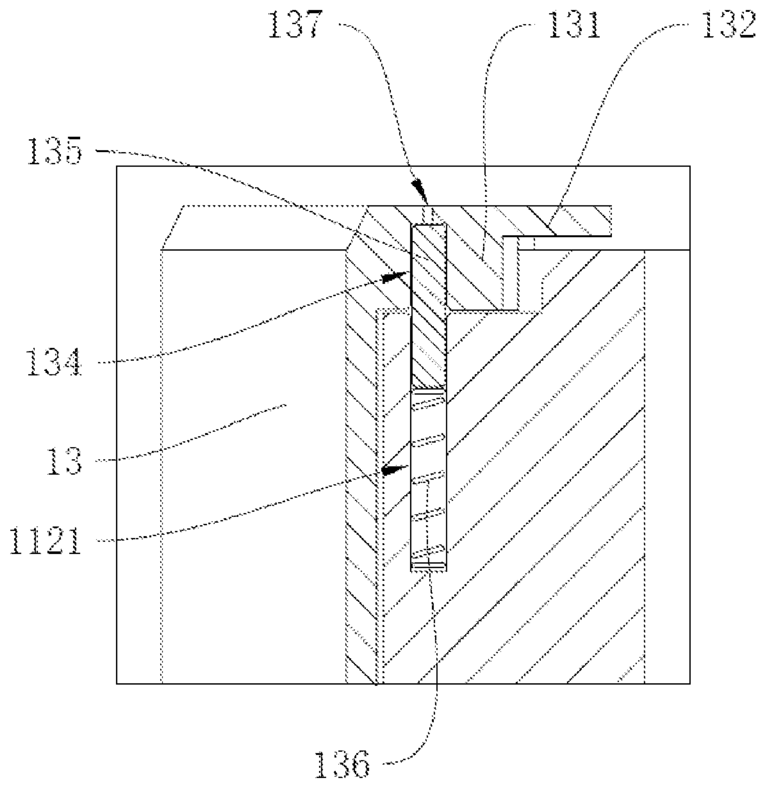
FIG. 11 is a schematic structural view of the first connecting member pivoted with the third connecting member of the display apparatus according to an embodiment of the present application.

In an embodiment, as shown in FIG. 11, the third connecting hole 1121 and the fourth connecting member 134 are both slidably connected to the second shaft body 135 in an axial direction. The second pivot structure also includes an elastic member 136 so that the second shaft body 135 abuts against a bottom wall of the fourth connecting member 134. The elastic member 136 can be configured as a spring, an elastic rubber column, and an elastic piece, etc. The bottom wall of the fourth connecting member 134 is provided with an abutting through hole 137, one end of the abutting through hole 137 is towards the end portion of the second shaft body 135. When it is necessary to disassemble the third connecting member 13 and the first pivotal portion 112, an external ejector pin can pass through the abutting through hole 137, and the external ejector pin can be abutted against the second shaft body 135 and pressed down to disassembly.

The third connecting member 13 is provided with a connecting through hole 133, and the traction member 142 is configured to penetrate the connecting through hole 133. After being inserted into the connecting through hole 133, the traction member 142 can be configured for fixation, thereby locking the form converting mechanism. In this embodiment, a traction through hole is provided outside the traction member 142. The traction through hole can not only connect the traction equipment, but also insert the latch to lock the form converting mechanism.

Figure 2:
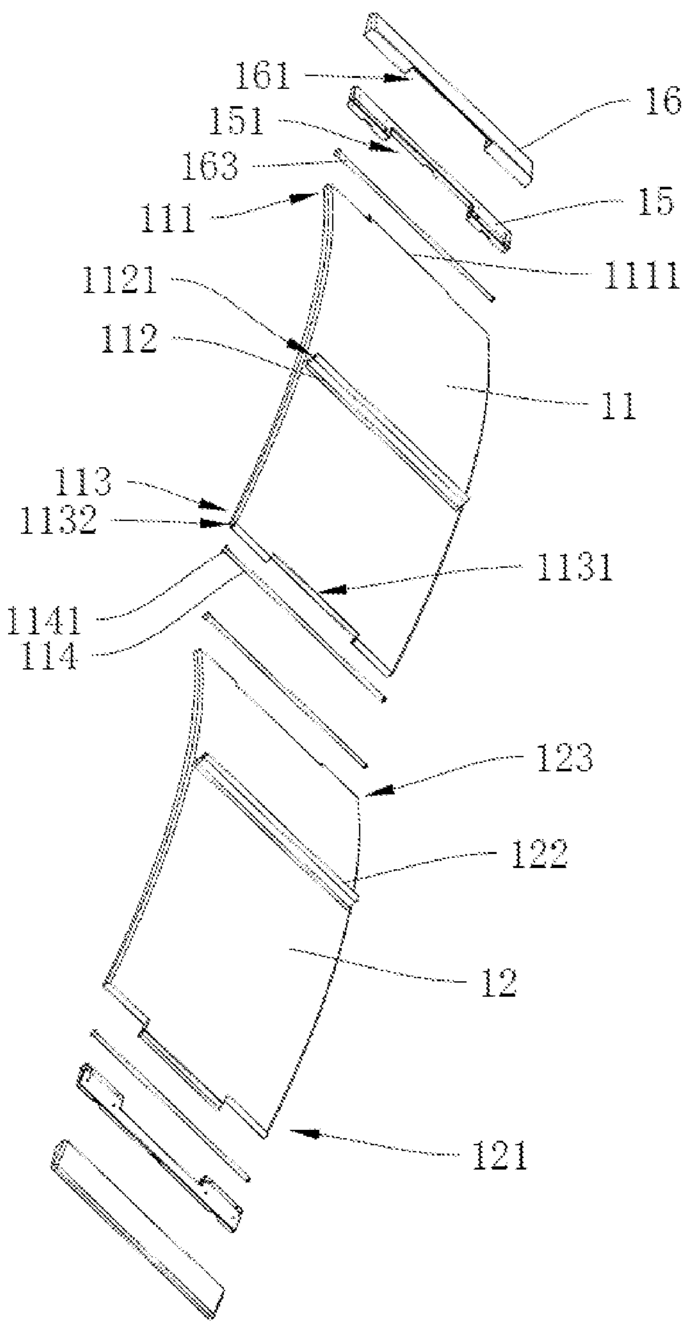
FIG. 2 is an exploded view of the display apparatus with some part hidden according to an embodiment of the present application.
Figure 12:
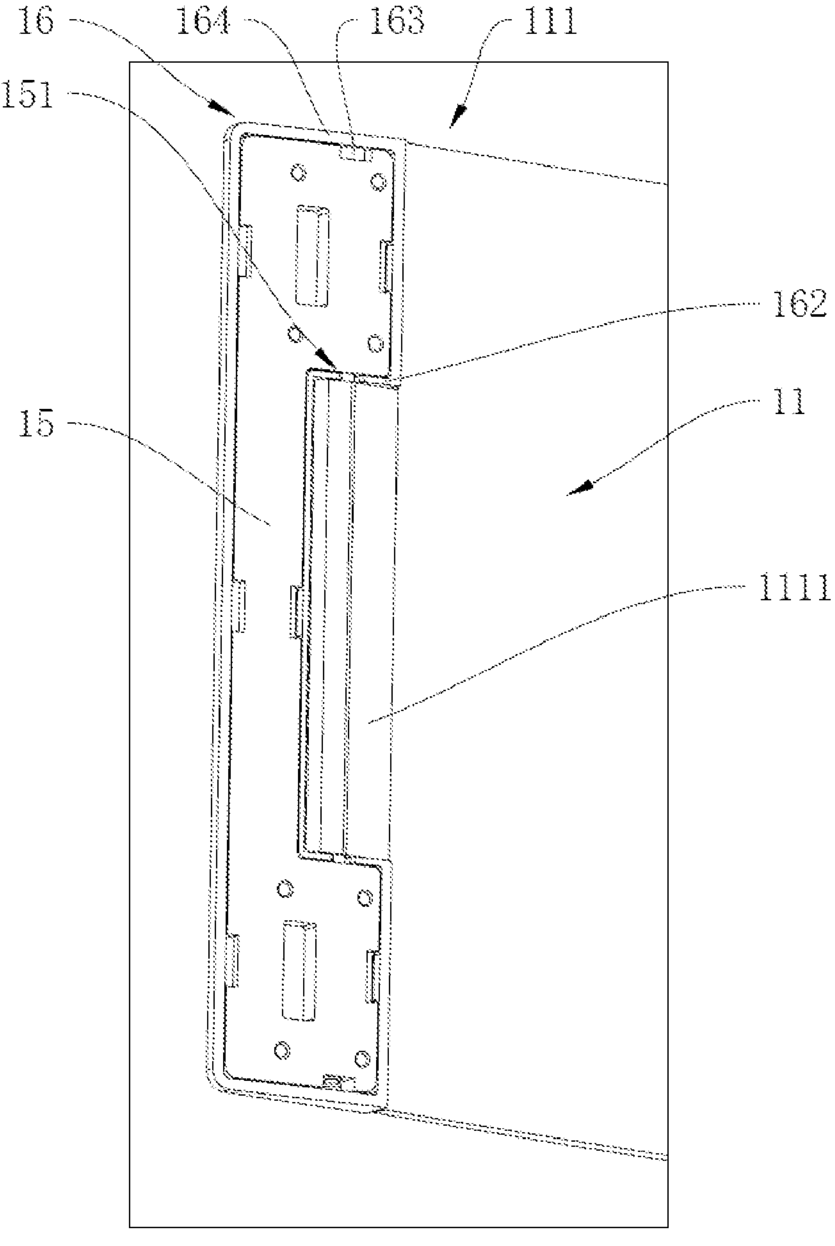
FIG. 12 is a schematic structural view of the first connecting member pivoted with the third connecting member of the display apparatus according to an embodiment of the present application.

As shown in FIG. 2 and FIG. 12, the form converting mechanism also includes a first connecting seat 15 for fixedly connecting to the flexible screen body 2. The first connecting seat 15 can be connected to the flexible screen body 2 through fasteners such as screws and bolts. The first outer end 111 is pivoted with the first connecting seat 15. The connecting seat is provided with a second opening 151, the first outer end 111 is provided with a second convex 1111, the second convex 1111 extends into the second opening 151, and the sidewall of the second convex 1111 is pivoted with the second opening 151, which makes the pivot structure easier to install.

The form converting mechanism also includes a first connecting seat 15 for fixedly connecting to the flexible screen body 2, and a cover body 16 covering the first connecting seat 15. A cover opening 161 is provided on one side of the cover body 16 towards the first connecting member 11, the first connecting member 11 passes through the cover opening 161, and the first outer end 111 is pivoted with the first connecting seat 15. The cover body 16 can reduce the exposure of components, improve the overall smoothness of the form converting mechanism, and reduce the entry of foreign matters such as the dust. As shown in FIG. 12, the cover body 16 includes a first sidewall section 162 provided between the first outer end 111 and the first connecting seat 15. The first sidewall section 162 can act as a spacer when the first outer end 111 rotates relative to the first connecting seat 15, reduce the friction loss between the first outer end 111 and the first connecting seat 15, and make the relative rotation of the first outer end 111 and the first connecting seat 15 smoother. In this embodiment, at least the first sidewall section 162 of the cover body 16 is made of plastic material, which further reduces the friction loss between the first outer end 111 and the first connecting seat 15.

A third shaft body 163 for pivotal connection is provided between the first outer end 111 and the first connecting seat 15. An end portion of the third shaft body 163 penetrates the first connecting seat 15 or the first outer end 111. In this embodiment, the first connecting seat 15 includes an outer arm portion sleeved on the first outer end 111, and the end portion of the third shaft body 163 extends outward through the outer arm portion of the first connecting seat 15. The cover body 16 includes a second sidewall section 164 configured to abut against the end portion of the shaft body 163 extending outward and prevent the third shaft body 163 from detaching. The cover body 16 is detachably connected to the first connecting seat 15, which improves the disassembly efficiency.

The first connecting seat 15 includes a first part and a second part detachably connected to the first part. The first part is configured to be connected with the flexible screen body 2, and the second part is pivoted with the first outer end 111, so that the flexible screen body 2 can be stored and transported independently, which reduces the interference of the form converting mechanism to the storage and transportation of the flexible screen body 2.

Since the display apparatus adopts all the technical solutions of all the embodiments of the form converting mechanism mentioned above, it has at least all the beneficial effects brought by the technical solutions of the above embodiments, which will not be described again here.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields, are included in the scope of the present application.

What is claimed is:

1. A form converting mechanism, configured for connecting to a back side of a flexible screen body, comprising:

a first connecting member;

a second connecting member;

a third connecting member; and a fourth connecting member;

wherein the first connecting member, the second connecting member, the third connecting member and the fourth connecting member are connected in sequence;

the first connecting member comprises a first outer end configured to be connected to one side end of the flexible screen body, a first pivotal portion and a first inner end; the second connecting member comprises a second outer end configured to be connected to the other side end of the flexible screen body, a second pivotal portion and a second inner end; and two ends of the third connecting member are respectively pivoted with the first pivotal portion and the second pivotal portion, and two ends of the fourth connecting member are respectively connected to the first inner end and the second inner end; at least one of the first connecting member, the second connecting member, the third connecting member and the fourth connecting member is configured to withstand an external force to change a distance from the first outer end to the second outer end.

2. The form converting mechanism according to claim 1, wherein a first pivotal structure is provided between the fourth connecting member and the first inner end, and the first pivotal structure comprises a first connecting hole and a first shaft body; the first connecting hole is sleeved on the first shaft body, and the first shaft body is rotatably connected to the first connecting hole.

3. The form converting mechanism according to claim 2, wherein the first pivotal structure further comprises a second connecting hole provided side by side with the first connecting hole and configured to be rotatably connected to the first shaft body; a through groove is provided between the first connecting hole and the second connecting hole, and two ends of the through groove are respectively communicated with the first connecting hole and the second connecting hole; the first shaft body is provided with a through path moving along a length direction of the through groove.

4. The form converting mechanism according to claim 3, wherein the fourth connecting member is provided with an away path in a direction away from the flexible screen body, and the fourth connecting member is provided with an abutting position abutting against the third connecting member; and at the abutting position, an angle between a tangent direction of the first connecting member at the first inner end towards the first outer end and the away path is greater than or equal to 90 degrees.

5. The form converting mechanism according to claim 4, wherein the first connecting hole is provided inside the second connecting hole;

at the abutting position, the first shaft body is connected to the first connecting hole; and in response to that the fourth connecting member is at a starting point of the away path, the first shaft body is connected to the second connecting hole.

6. The form converting mechanism according to claim 4, wherein a first opening is provided on the first inner end, and a first convex is provided on one side of the fourth connecting member towards the first connecting member; the first convex is configured to extend into the first opening, and the first pivotal structure is provided between the first convex and the first opening.

7. The form converting mechanism according to claim 6, wherein the first shaft body is configured to transversely penetrate the first convex and a sidewall of the first opening, and an end portion of the first shaft body is provided with a flange; and a counter recess is provided outside the sidewall of the first opening, and the flange is accommodated in the counter recess.

8. The form converting mechanism according to claim 1, wherein a second pivotal structure is provided between the third connecting member and the first pivotal portion, and the second pivotal structure comprises a third connecting hole, a fourth connecting hole and a second shaft body; the third connecting hole and the fourth connecting hole are respectively sleeved on both ends of the second shaft body, and the fourth connecting hole is rotatably connected to the second shaft body; and the third connecting hole is threadedly connected to the second shaft body; or the third connecting hole and the fourth connecting hole are both slidingly connected to the second shaft body in an axial direction of the second shaft body, and the second pivotal structure further comprises an elastic member so that the second shaft body is abutted against a bottom wall of the fourth connecting hole; and an abutting through hole is provided on the bottom wall of the fourth connecting hole, and one end of the abutting through hole is towards an end portion of the second shaft body.

9. The form converting mechanism according to claim 1, wherein the first connecting member and the second connecting member are both configured as arc-shaped plates, and a first arc-shaped surface is provided on one side of the third connecting member towards the fourth connecting member; and an inner section of a convex surface of the first connecting member and an inner section of a convex surface of the second connecting member are both configured to abut against the first arc-shaped surface.

10. The form converting mechanism according to claim 9, wherein the third connecting member further comprises a second arc-shaped surface, and the first arc-shaped surface and the second arc-shaped surface are respectively provided on both sides of the first pivotal portion; a distance between the first arc-shaped surface and the second arc-shaped surface is configured to gradually increase in a direction away from the fourth connecting member, and the first arc-shaped surface is configured to abut against the first connecting member.

11. The form converting mechanism according to claim 10, wherein a first vertical plate is provided on one side of the third connecting member towards the fourth connecting member, and the first arc-shaped surface and the second arc-shaped surface are both provided on one side of the first vertical plate towards the fourth connecting member.

12. The form converting mechanism according to claim 11, wherein a second vertical plate is provided on an outer end of the side of the third connecting member towards the fourth connecting member, and a height of the second vertical plate is partially greater than a height of the first vertical plate, so that the second vertical plate is configured to at least partially cover an end portion of the first connecting member and/or an end portion of the second connecting member.

13. The form converting mechanism according to claim 1, wherein the third connecting member is provided with a connecting through hole; the fourth connecting member is provided with a traction member extending towards the third connecting member, and the traction member is configured to penetrate into the connecting through hole.

14. The form converting mechanism according to claim 1, wherein the fourth connecting member is provided with a screen body connecting end configured to be connected to the flexible screen body.

15. The form converting mechanism according to claim 1, further comprising:

a first connecting seat configured to be fixedly connected to the flexible screen body;

wherein the first outer end is pivoted with the first connecting seat;

the connecting seat is provided with a second opening, and the first outer end is provided with a second convex configured to extend into the second opening; and a sidewall of the second convex is pivoted with the second opening.

16. The form converting mechanism according to claim 1, further comprising:

a first connecting seat configured to be fixedly connected to the flexible screen body; and a cover body covering the first connecting seat;

wherein one side of the cover body towards the first connecting member is provided with a cover opening, the first connecting member is configured to pass through the cover opening, and the first outer end is pivoted with the first connecting seat.

17. The form converting mechanism according to claim 16, wherein the cover body comprises a first sidewall section provided between the first outer end and the first connecting seat.

18. The form converting mechanism according to claim 16, wherein a third shaft body for pivotal connection is provided between the first outer end and the first connecting seat, and an end portion of the third shaft body is configured to penetrate outwardly through the first connecting seat or the first outer end; and the cover body is in at least one of following configurations:

the cover body comprises a second sidewall section configured to abut against an extended end portion of the third shaft body; and the cover body is detachably connected to the first connecting seat.

19. The form converting mechanism according to claim 1, further comprising:

a first connecting seat configured to be fixedly connected to the flexible screen body;

wherein the first connecting seat comprises a first part and a second part detachably connected to the first part; the first part is configured to be connected to the flexible screen body, and the second part is pivoted with the first outer end.

20. A display apparatus, comprising a flexible screen body and the form converting mechanism according to claim 1.

* * * * *